Sept. 16, 1947.  E. J. LE CLAIRE  2,427,564
BOILER SYSTEM WITH COOKING CHAMBER
Filed Feb. 11, 1943  2 Sheets-Sheet 1

Inventor
Eugene J. Le Claire
By A. S. Johnson
Attorney

Sept. 16, 1947.     E. J. LE CLAIRE     2,427,564
BOILER SYSTEM WITH COOKING CHAMBER
Filed Feb. 11, 1943     2 Sheets-Sheet 2
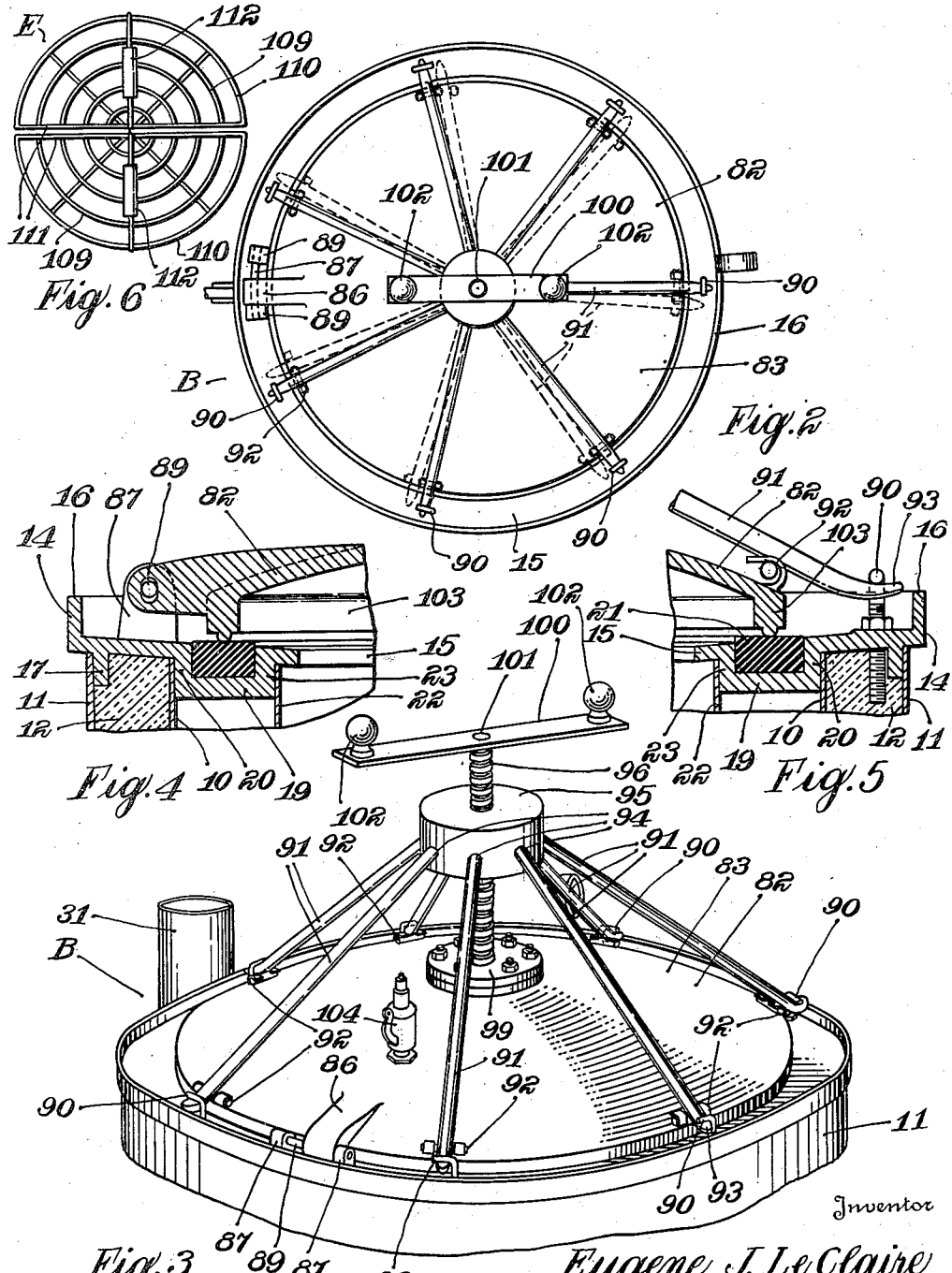

Patented Sept. 16, 1947

2,427,564

UNITED STATES PATENT OFFICE 2,427,564

BOILER SYSTEM WITH COOKING CHAMBER

Eugene J. Le Claire, St. Paul, Minn., assignor to Harry F. Joesting, St. Paul, Minn.

Application February 11, 1943, Serial No. 475,589

1 Claim. (Cl. 126—369)

My invention relates to an improvement in boiler systems, wherein it is desired to provide a simple and effective device for generating heat for use in cooking and sterilizing operations.

Many large restaurants are equipped with steam generating plants which provide steam for use in cooking and sterilizing. Smaller restaurants and other establishments such as small hospitals and the like, do not have a suitable source of steam pressure, and rely on other means of cooking and sterilizing. Where small steam generating systems are at present employed, these plants are often slow in operation and require considerable care in use.

It is the object of the present invention to provide a simple boiler system which will operate quickly and economically to generate steam pressure for use in cooking, sterilizing, and the like. This boiler system will operate to provide steam in an extremely short period of time, and will automatically maintain a proper water level so as to require little or no attention. My boiler system is so arranged that it will require but a small amount of water, and as a result is particularly adapted for portable use in travelling army units or the like. It is also readily adaptable for use in small restaurants, hospitals and the like, where a ready source of steam is not available.

A feature of the present invention resides in the fact that all parts of the system are under equal pressure. The boiler device operates to generate steam. This steam is transmitted to a pressure vessel which may be used for cooking or sterilizing purposes. The same pressure is transmitted to the water supply tank used for feeding the boiler. Furthermore the float which regulates the level of liquid within the boiler is subjected to similar pressure so that the operating pressure of the device will not effect the operation of the float. As a result there is little danger of the steam pressure forcing the water within the boiler to some other part of the system, thereby emptying the boiler and causing serious damage to the boiler.

A feature of the present invention lies in the provision of a steam boiler system in which the steam supply is regulated by the pressure generated within the boiler. The apparatus may be set to generate a predetermined amount of pressure. When sufficient pressure has been generated the steam pressure acts to cut off the heat supply so as to prevent a greater pressure from being generated. Thus the building up of an extremely high pressure within the system is prevented at its source.

A feature of the present invention lies in the combination of a simple but effective boiler system with a pressure cooker chamber into which the steam pressure is admitted. This steam pressure may be used for cooking purposes, such as for cooking vegetables or the like, or may be used to provide heat for sterilizing at high temperatures. My boiler system is so arranged that it may be converted from a cooking device to a sterilizing apparatus by merely replacing the cooking utensils by a closed chamber suitable for containing material to be sterilized at high temperatures.

A feature of the present invention lies in the provision of a supply tank which is maintained under the pressure which is equalized so that the liquid may be fed into the boiler just as readily as though no pressure existed in the boiler. This system is combined with a steam valve which is so arranged as to permit the passage of air therethrough, but to prevent the passage of steam. As a result the air within the cooking or sterilizing chamber may be replaced by steam, the air entering the water supply tank and being compressed to the same pressure that exists in the cooking chamber.

A further feature of the present invention lies in the construction of the boiler system so that the boiler is mounted near the base of an insulated compartment and the cooking chamber is located above the boiler. As a result any heat not actually used to convert the water to steam in the boiler and may be used to heat the outer surface of the cooking compartment. Thus the entire system may be heated in an extremely short period of time and a quick source of steam under pressure is provided.

An added feature of the present invention lies in the top construction of the pressure chamber. This top is so arranged that it may be hingedly supported in position to close the pressure chamber, or may be pivotally opened away from the cooking chamber. When in closed position the cover is held in place by a series of lever arms which seal the compartment under pressure to prevent the leakage of steam.

These and other objects and novel features of my invention will be more clearly and fully set forth in the following specification and claim.

In the drawings forming a part of my specification:

Figure 2 is a diagrammatic top plan view of the system showing the construction thereof.

Figure 3 is a perspective view of the top of the cooker compartment showing the closure employed for locking the chamber closed.

Figure 4 is a sectional view through a portion of the pressure chamber wall and the top of the pressure chamber showing the manner in which the top is pivotally connected to the body of the boiler system.

Figure 5 is a view similar to Figure 4 showing the pivotal connection between one of the locking levers and the top closure of the pressure chamber.

Figure 6 is a top plan view of a type of basket which may be used within the pressure chamber to contain vegetables or the like for cooking purposes.

Figure 1:
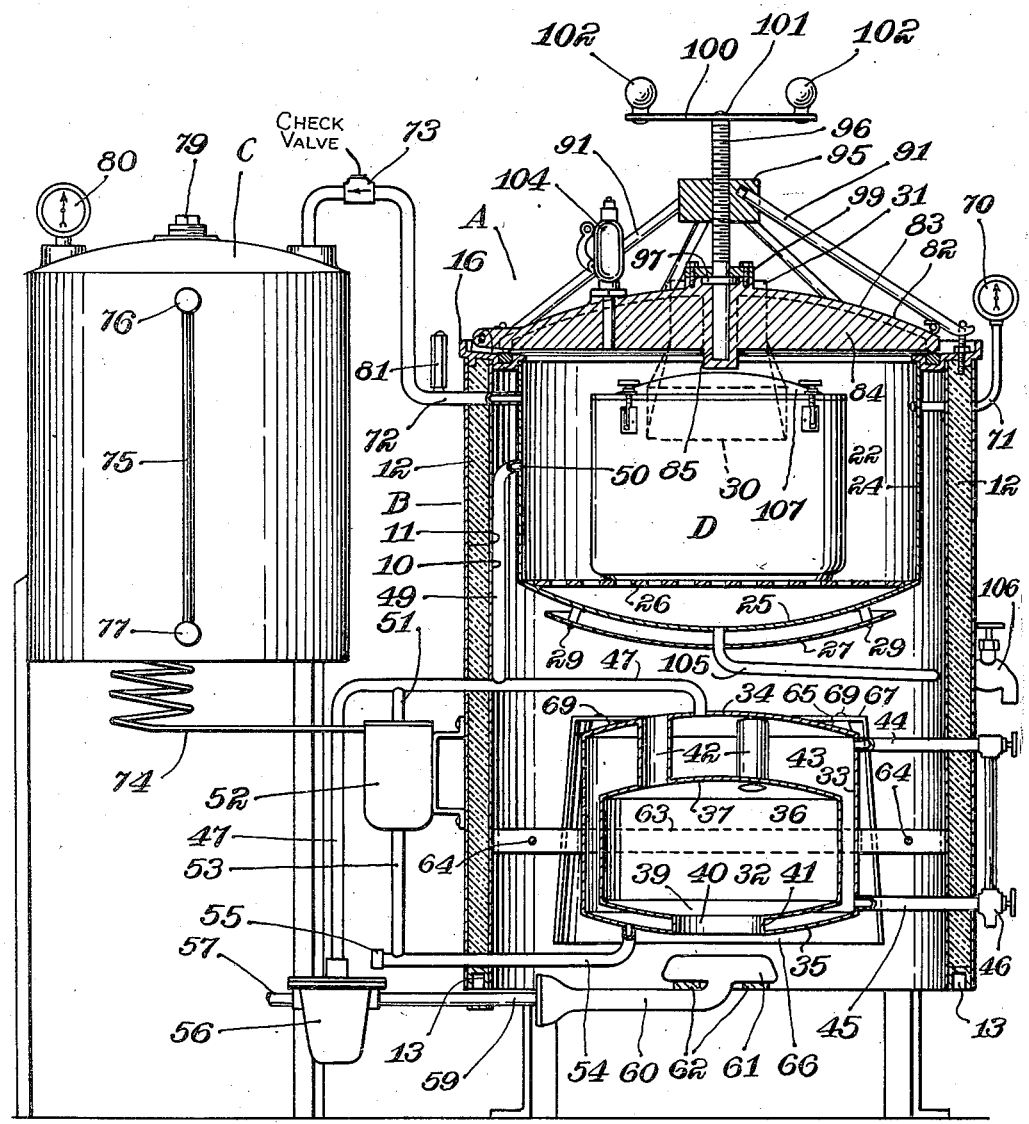
Figure 1 is a vertical sectional view through a portion of the boiler system, the remainder of the system being shown in elevation.

The boiler system A includes a boiler and cooker element B, and a water supply tank C, which are associated together in actual use. The supply tank C may be attached to the casing of the boiler system B, or may be maintained independently thereof depending upon which arrangement is more suitable and convenient for each particular installation. In the accompanying drawings the supply tank C is shown mounted on the separate support adjacent the boiler system B, but it should be understood that various other elements for supporting the supply tank could readily be provided.

The boiler system unit B includes inner and outer hollow cylinder shells 10 and 11, having a thickness of insulation 12 therebetween. The lower end of the space between the shells 10 and 11 is closed by a channel-shaped ring 13, while the upper end thereof is closed by a ring-shaped sealing member 14, the construction of which is best illustrated in Figures 4 and 5 of the drawings.

The ring-shaped sealing element 14 includes a slightly tapered flat ring 15 provided at its outer extremity with an upstanding flange 16. A downwardly extending flange 17 lies inwardly of the outer casing shell 11, and is secured thereto. A channel-shaped depression 19 is provided between the edges of the ring-shaped member 15, and the outer wall 20 of this channel 19 contacts the inner casing wall 10 and is secured thereto. A gasket of rubber or other suitable material 21 is provided within the channel 19 so as to form a seal with the top closure of the chamber.

A cooking vessel 22 is secured adjacent the wall 23 of the channel 19. This vessel 22 includes a substantially cylindrical wall 24 and a downwardly bowed bottom 25. The precise shape of the cooking vessel, however, is not of extreme importance in the present construction. A perforated plate 26 is preferably provided within the vessel 22 above the base 25 to act as a support for a sterilizing receptacle D, or a cooking basket E, such as is illustrated in Figure 6 of the drawings.

A baffle 27 is secured by spaced bolts 29, or other suitable means, to the bottom 25 of the cooking vessel 22 so that all of the heat from the boiler unit, which will be later described, will not be directed against the bottom 25 of the vessel, but will be distributed along the bottom and along the side walls of the same. A chimney outlet 30 is provided through the casing walls 10 and 11. This chimney opening communicates with a suitable chimney pipe 31, as illustrated.

Below the cooking vessel 22, I provide a boiler unit 32. This boiler unit includes a substantially cylindrical outer shell 33 having an upwardly bowed top 34 and a downwardly bowed bottom 35. The boiler is also provided with an inner cylindrical wall 36, similarly provided with a bowed top 37 and a downwardly bowed bottom 39. An opening 40 extends through both the bottom 39 of the inner boiler chamber and the bottom 35 of the outer boiler chamber, and a cylindrical sleeve 41 connects the bottoms of the two compartments, sealing these two elements together. A series of angularly spaced sleeves 42 extend through the tops 34 and 37 of the inner and outer boiler chambers to provide a means of permitting the heated air within the inner boiler compartment to escape upwardly therefrom.

From the foregoing description it will be noted that the space 43 between the inner and outer boiler chambers is sealed and is ordinarily filled with liquid. Pipes 44 and 45 extend laterally from the upper and lower ends of the boiler chamber 43, and a liquid gage 46 is provided between the pipes 44 and 45, which extend through the casing walls 10 and 11. As is usual practice, valves are provided in the upper and lower ends of the water glass to permit the pipes 44 and 45 to be shut off in case of injury to the water glass.

A pipe 47 extends from the top 34 of the outer boiler wall to communicate steam pressure to various parts of the system. A pipe 49 connected to the pipe 47 is provided with an inlet 50 into the cooking vessel 22 at a point spaced from the lower end thereof. The pipe 47 is also connected by a pipe 51 to the top of the float chamber 52 to transmit pressure above the liquid in the float chamber. The lower end of the float chamber is connected by a feed pipe 53 to the boiler drain pipe 54 connected at the lower extremity of the boiler. A cap or plug 55 on the ends of the drain pipe 54 permits the liquid to be drained from the boiler, should occasion require such action.

The pipe 47 is connected to a valve 56 which controls the flow of gas or other heating fluid through the pipe 57 from the source of fluid supply, to the pipe 59 leading to the gas manifold 60 on the burner 61. The burner 61 is supported by transverse supports 62 which hold the burner directly beneath the boiler.

The boiler is supported by means of a pair of opposed clamping straps 63 which encircle the body of the outer boiler wall 33 and which are terminally connected to the inner casing wall 10. Clamping bolts 64 provide a means of clamping the pair of straps 63 about the boiler to support the same.

The baffle 65 is secured in outwardly spaced relation to the outer surface of the boiler. The baffle 65 includes a tapered skirt 66 and a top flange 67 secured by bolts or other means 69 to the outer casing of the boiler. The baffle 65 is formed in two parts which are semi-circular in shape so that they may readily clamp about the various pipes connected to the boiler and about the supporting straps 63.

A pressure gage 70 is preferably secured by a conduit 71 in communication with the interior surface of the cooking vessel 22 so as to measure the pressure therein. A pipe 72 also communicates with the interior of the cooking vessel 22 and extends through the check valve 73 to the upper extremity of the supply tank C. The check valve 73 is arranged to permit the entrance of fluid into the tank C, but to prevent the flow of fluid in a reverse direction from the tank to the cooking vessel. The lower extremity of the tank C is connected by a flexible conduit 74 to the top of the float chamber 52 so as to feed fluid to the float chamber as required. A water level glass 75 is connected at its ends 76 and 77 into the tank C so that the level of liquid within this tank may be observed at all times. The tank C is provided with a sealing plug 79 of any suitable design and is also equipped with a pressure gage 80 by means of which the pressure within the pressure chamber may be measured. A valve 81 is provided either in the pipe line 72, or extending through the closure of the cooking vessel to permit the escape of air from the cooking vessel without allowing steam to escape therefrom. The valve 81 is of a type similar to that used on steam radiators or the like, such a valve permitting air to pass therethrough from the cooking vessel, but automatically closing to prevent the escape of steam therethrough. A valve capable of serving this purpose is shown in Patent 563,879 to Andrew G. Paul.

The construction of the cooking vessel closure 82 is best understood from an examination of Figures 1 through 5 of the drawings. This closure 82 comprises an upwardly bulged or dome-shaped top surface 83 which is strengthened by means of angularly spaced strengthening ribs or fins 84 on the undersurface of the top. A hollow cylinder well 85 is provided at the center of the closure 82 for a purpose which will later be described in detail.

The top of the closure 82 is provided with a hinge lug 86 extending from one surface thereof. A pair of spaced lugs 87 extend upwardly from the sealing ring 15. A rod 89 connects these lugs 87, this rod extending through the hinge lug 86 to hingedly connect the closure to the body of the device. As the hinge lug 86 is substantially narrower than the distance between the lugs 87, it is obvious that the cover is angularly adjustable as well as hingedly secured.

A series of angularly spaced inverted L-shaped bolts 90 are attached to the ring 15 and extend upwardly therefrom. The free ends of the lugs 90 point in a single rotative direction. Lever arms 91 are hingedly and slidably connected to the closure 82 at pivot points 92 near the edge of the closure 82. One end 93 of each of the lever arms 91 is somewhat hook-shaped to hook beneath the bolts 90. The other ends of each of the lever arms 91 is extended into a recess 94 in the cross head 95. The cross head 95 is internally threaded to engage a threaded shaft 96 which extends into the cylindrical socket 85 in the closure. A flange 97 on the shaft 96 is seated in a suitable socket between the top of the closure 82 and a retaining plate 99 which holds the shaft 96 in place.

A crank arm 100 is centrally secured at 101 to the shaft 96 and is provided with knobs 102, by means of which the shaft 96 may be rotated. The shaft 96 will rotate freely with respect to the closure 82, being held from longitudinal movement with respect thereby by the engagement of the frame 97 with its cooperating socket and retaining plate 99.

It will be noted that rotation of the shaft 96 will raise and lower the cross head 95, thereby pivoting the levers 91 in unison. The apertures 94 in the cross head 95 are of sufficient size to permit the necessary pivotal movement of the arms therein. As the cross head 95 moves downwardly, lowering the inner ends of the levers 91 in unison, the outer ends of these levers are pivoted upwardly into engagement with the horizontal ends of the bolts 90. Because of the angular adjustability of the hinge supporting the closure 82, the lever arms 91 may be moved from position beneath the horizontal portions of the bolts 92 to the angularly spaced position with respect thereto, when the cover is in the dotted outline position illustrated in Figure 2 of the drawings. When the closure is in the position illustrated in Figures 1, 3, and 5 of the drawings, the closure is clamped against the boiler unit, the cylindrical flange 103 thereof sealing against the gasket 21. However, by raising the cross head 95 so as to release the lever arms 91 from the bolts 90, the cover may be rotated angularly a sufficient distance to place the lever arms in the dotted outline position shown in Figure 2, permitting the closure to be hingedly swung into open position.

The closure 82 is provided with a safety valve 104 extending therethrough so as to release excess pressure, should such pressure be generated. A drain pipe 105 is provided at the base of the cooking vessel 22, this drain pipe leading to a drain faucet 106. Operation of the faucet 106 will not only release steam pressure, but also permit the drainage of condensed fluid from the bottom of the cooking vessel 22.

The sterilizing receptacle D may be of any suitable shape, size, or style, and is preferably provided with a closed cover 107 to prevent the entrance of steam or liquid into the receptacle D. When the boiler system is used for cooking purposes, a divided basket, such as E may be used. The basket E is provided with a base 109, and semi-circular side walls 110 which are connected with the straight diametrically extending wall 111. Handles 112 on the basket sections permit the basket sections to be individually handled.

The operation of the boiler is believed obvious from an examination of the foregoing description. The boiler is filled with water to a point spaced slightly above the top 37 of the inner boiler wall and is maintained at this height by a float within the float chamber 52. Pressure on opposite sides of the float is equalized through the pipes 47 and 51, communicating with the top of the float chamber, and the pipes 53 and 54 communicating with the bottom of the float chamber through which liquid enters the boiler. The valve 56 controls the flow of gas or heat to the boiler, the pressure within the boiler acting upon the valve to open or close the same. The steam is quickly generated due to the relatively small body of water in combination with the boiler and due to the large surface area of the boiler itself. This steam is transmitted into the cooking vessel 22 and the air within this vessel is exhausted through the valve 81. Pressure is transmitted to the top of the water tank through the pipe 72 and the check valve 73. This prevents any danger of the water in the boiler being forced rearwardly through the float chamber and into the supply tank.

In accordance with the patent statutes, I have described the principles of construction and operation of my boiler system, and while I have endeavored to set forth the best embodiment thereof, I desire to have it understood that obvious changes may be made within the scope of the following claim without departing from the spirit of my invention.

I claim:

A boiler system including a boiler, a cooking chamber having a closure thereon by means of which the chamber may be closed to submit the chamber to pressure, a pressure connection from the top of said boiler to a point on said cooking chamber spaced substantially from the bottom thereof, a closed fluid supply tank, a connection from a point near the top of said cooking chamber to the top of said fluid supply tank, a valve connected to said last named connection, said valve being capable of venting air, but not steam, to remove air from said cooking chamber and said last named connection, a check valve in said last named connection for allowing steam to enter said fluid supply tank, but preventing a return flow of fluid to said cooking chamber, a fluid supply line connected to said boiler near the lower end thereof, a float chamber connected to said fluid supply line, a water supply line extending from the bottom of said fluid supply tank to the top of said float chamber, and a pressure connection from the top of said boiler to the top of said float chamber.

EUGENE J. LE CLAIRE.

REFERENCES CITED

The following references are of record in the file of this patent:

UNITED STATES PATENTS

| Number | Name | Date |
|---|---|---|
| 2,279,976 | Faust | Apr. 14, 1942 |
| 2,288,223 | Bomyer | June 30, 1942 |
| 2,291,872 | Brantly | Aug. 4, 1942 |
| 2,324,695 | Hamilton | July 20, 1943 |
| 118,068 | Stevenson | Aug. 15, 1871 |
| 186,067 | Thompson | Jan. 9, 1877 |
| 764,720 | Gray | July 12, 1904 |
| 1,175,036 | Worsham | Mar. 14, 1916 |
| 1,496,487 | Peek | June 3, 1924 |
| 1,627,450 | Otis | May 3, 1927 |
| 2,033,305 | Roy | Mar. 10, 1936 |
| 2,176,306 | Kuss | Oct. 17, 1939 |
| 844,873 | Keenan | Feb. 19, 1907 |
| 733,259 | Neiman | July 7, 1903 |
| 409,360 | Jones | Aug. 20, 1889 |
| 563,879 | Paul | July 14, 1896 |
| 2,283,910 | Borsett | May 26, 1942 |
| 258,359 | Bowne | May 23, 1882 |
| 315,160 | Pentecost | Apr. 7, 1885 |